United States Patent [19]

Larsen et al.

[11] Patent Number: 5,302,222
[45] Date of Patent: Apr. 12, 1994

[54] DEADFOLD STICKER METHOD

[75] Inventors: Brian D. Larsen; Lloyd Tinklenberg, both of Worthington, Minn.

[73] Assignee: Bedford Industries, Inc., Worthington, Minn.

[21] Appl. No.: 19,897

[22] Filed: Feb. 19, 1993

Related U.S. Application Data

[62] Division of Ser. No. 790,349, Nov. 12, 1991, Pat. No. 5,227,210.

[51] Int. Cl.⁵ .................... B32B 31/16; B32B 31/04
[52] U.S. Cl. ................................ 156/226; 156/227; 156/249
[58] Field of Search ............... 156/247, 249, 226, 227, 156/542

[56] References Cited

U.S. PATENT DOCUMENTS

| | | |
|---|---|---|
| 331,357 | 12/1885 | Wineberger . |
| 907,492 | 12/1908 | Graser . |
| 1,903,839 | 4/1933 | Royal . |
| 3,130,984 | 4/1964 | Fenberg . |
| 3,354,019 | 11/1967 | Davies . |
| 3,457,137 | 7/1969 | McCarthy . |
| 3,537,636 | 11/1970 | Rochette . |
| 3,869,328 | 3/1975 | Instance . |
| 3,973,294 | 8/1976 | Pfizenmaier . |
| 4,246,058 | 1/1981 | Reed . |
| 4,255,220 | 3/1981 | Kucheck et al. . |
| 4,267,768 | 5/1981 | Cieslak et al. . |
| 4,285,999 | 8/1981 | Olivieri . |
| 4,314,869 | 2/1982 | Crankshaw . |
| 4,411,644 | 10/1983 | Tinklenberg . |
| 4,420,355 | 12/1983 | Saur . |
| 4,488,922 | 12/1984 | Instance . |
| 4,502,910 | 3/1985 | Voltmer et al. . |
| 4,539,248 | 9/1985 | Brockington et al. . |
| 4,863,772 | 9/1989 | Cross . |

FOREIGN PATENT DOCUMENTS

| | | |
|---|---|---|
| 1270390 | 10/1960 | France . |
| 2048006 | 3/1971 | France . |
| 2401212 | 3/1979 | France . |
| 401812 | 5/1966 | Switzerland . |
| 612141 | 7/1979 | Switzerland . |
| 501475 | 2/1939 | United Kingdom . |
| 1221588 | 2/1971 | United Kingdom . |

Primary Examiner—Alexander S. Thomas
Attorney, Agent, or Firm—Robert C. Baker

[57] ABSTRACT

The new dispensing roll of deadfold stickers comprises a length of flexible carrier tape having a low adhesion surface and a multiplicity of flexible deadfold stickers releasably adhered to the low adhesion surface for easy removal therefrom. Each deadfold sticker comprises a laminate of pliable layers and at least two deadfold wires in spaced parallel alignment embedded in the laminate in a direction transverse to the length of the carrier tape. The carrier tape with releasably adhered deadfold stickers is wound upon itself in the dispensing roll. The dispensing roll is used in automatic machinery to form mouth-foldable deadfold reclosable bags; and the preferred reclosures are those having three creases of fold line formed by two folding steps.

4 Claims, 2 Drawing Sheets

DEADFOLD STICKER METHOD

This is a divisional of our co-pending application Ser. No. 07/790,349, filed Nov. 12, 1991 now U.S. Pat. No. 5,227,210.

BACKGROUND OF THE INVENTION

This invention relates to deadfold sticker systems, and more particularly to a new article of commerce, namely a dispensing roll of deadfold stickers. The invention also relates to a method of dispensing deadfold reclosure stickers from a dispensing roll onto the side of a flexible bag, and to the closure folding of such bags.

Mouth-foldable deadfold reclosures to protect residual or unused bag contents can be formed by making a simple roll or fold of a flattened bag mouth over itself. The deadfold feature is part of the bag wall.

The desirability of incorporating mouth-foldable deadfold reclosure features into the structure of a flexible bag has been recognized for ages, even for over a century as, for example, illustrated by U.S. Pat. No. 331,357 of Dec. 1, 1885. Despite the desirability and benefits of mouth-foldable deadfold reclosable bags, the heretofore known techniques and procedures to make and use such bags have apparently been so cumbersome and so poor that such reclosures have not heretofore, insofar as is known, enjoyed any significant adoption by manufacturers of bagged products.

The present invention provides the art with an entirely new and simplified approach for the making of mouth-foldable deadfold reclosable flexible bags, and also provides deadfold reclosure folding. Especially significant is the unique dispensing roll of this invention.

SUMMARY OF THE INVENTION

The invention provides a dispensing roll of deadfold stickers having, among other things, the unique property of deadfold wires transversely aligned to the length of the dispensing roll (i.e., not coiled or curved in the roll as happens in standard practice with deadfold wires aligned lengthwise in a roll). This preferred transverse alignment for the wires permits the wires of each discrete sticker of the dispensing roll to be in a straight condition in the roll and therefore permits easier handling of discrete stickers of the roll in automatic machinery for affixing the stickers to bags.

The new dispensing roll of deadfold stickers comprises a length of flexible carrier tape having a low adhesion surface and a multiplicity of flexible deadfold stickers having a base surface releasably adhered to that low adhesion surface for easy removal therefrom. Each deadfold sticker comprises a laminate of pliable layers plus at least two deadfold wires in spaced parallel alignment embedded in the laminate in a direction transverse to the length of the carrier tape. The carrier tape with the deadfold stickers releasably adhered to it is wound upon itself in the dispensing roll. Thus, the deadfold wires of the discrete deadfold stickers of the dispensing roll are in transverse parallel alignment in the roll.

The laminate of pliable layers of the stickers includes an adhesive layer which forms the base surface releasably adhered to the low adhesion surface of the tape. The most preferred adhesive layer comprises pressure sensitive adhesive.

The deadfold stickers are preferably in spaced linear relationship along the length of the carrier tape. They have two dimensions of significance, namely a first dimension transverse to the length of the carrier tape and a second dimension parallel to the length of the carrier tape. Interestingly, the first dimension is most preferably greater than the second dimension.

One of the more significant features of the new dispensing roll is that its deadfold stickers are equipped with deadfold wires having a diameter at least twice as great (generally at least three times as great) as the total thickness of all other layers of the laminate forming the deadfold sticker. The stickers are relatively exceedingly thin except for their thickness caused by large or thick deadfold wires.

Several other features and characteristics of the dispensing roll, as further discussed below, make it highly advantageous for use in the manufacture of deadfold reclosable bags. One step of the manufacturing method is that of conveying flexible bags in linear alignment, with the mouth end of the bags facing a common direction, and preferably with the bags unfilled and in relatively flattened condition. Another step is that of drawing the flexible carrier tape from the dispensing roll of the invention, and this is done around a stripper or peeler element so as to release a discrete reclosure sticker from the tape and quickly or simultaneously move the sticker into adherence (at least to a temporary degree) onto the side or wall surface of a flexible bag. This is done in a manner such that the leading edge (with its deadfold wire near and parallel to that leading edge) is first released and temporarily adhered to the bag at a location near the bag mouth and effective to place the deadfold wires in perpendicular relation to the bag mouth. The temporarily adhered reclosure sticker is then passed, with the area of the bag wall covered by it, between rollers to apply pressure for more firmly affixing the reclosure sticker on the bag.

Many other benefits and advantages of the invention will be evident as this description proceeds.

DESCRIPTION OF THE PREFERRED EMBODIMENT

Figure 1:
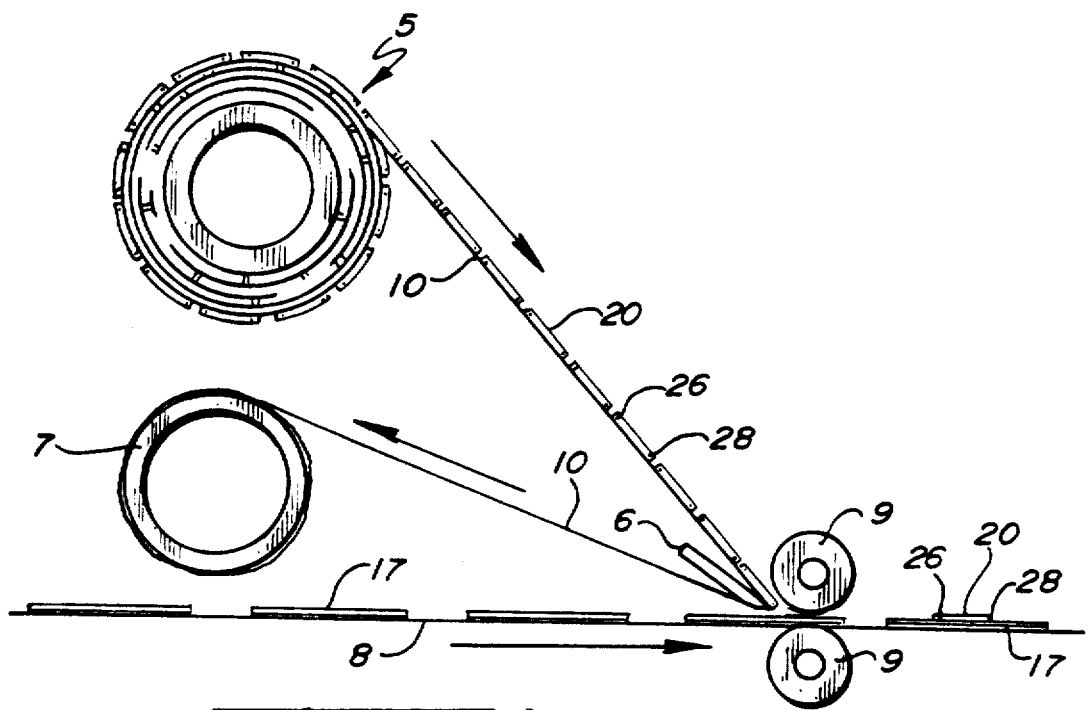
FIG. 1 is a schematic side elevation of a dispensing roll of the invention in combination with apparatus of the invention for drawing a carrier tape of deadfold reclosure stickers from the dispensing roll and applying the stickers onto the side of a flexible bag.

Referring to FIG. 1, the dispensing roll 5 of the invention comprises a length of flexible carrier tape 10 and a multiplicity of flexible deadfold stickers 20 releasably adhered to the carrier tape. The adherence of the stickers to the carrier tape is strong enough to keep the stickers 20 united to the carrier tape as it is drawn from a pay-out dispensing roll 5, but weak enough to permit easy removal or lift off of the stickers as by the technique of pulling the flexible carrier tape 10 around a stripper or peeler element or bar 6. The length of carrier tape leaving the stripper element 6 is wound upon a take-up reel 7 which is powered in any suitable manner to effect the drawing of the carrier tape from the pay-out roll 5. Indexing or stepwise withdrawal of the carrier tape from the pay-out roll is an alternative contemplated by the invention, and may be important where a single apparatus set-up is employed for applying one size deadfold sticker to a particular size bag and then at a later time employed for applying an entirely different size deadfold sticker to an entirely different size bag. The flow of operations for applying the deadfold stickers necessarily must be adjusted in speed or movement when the size of the stickers as well as the bags is changed.

FIG. 1 illustrates a conveyor 8 carrying a multiplicity of open-mouthed bags 17 in linear sequential alignment and with the mouth end of the bags facing a common direction, illustratively a directly lateral direction. Preferably the bags will be unfilled and in flattened condition at the time the stickers 20 are affixed.

The peel element 6 is preferably located rather close to the route of the bags 17 on the conveyor 8. For example, the peel bar may be within a millimeter or two of the bag surface on which a deadfold sticker is to be applied. As a deadfold sticker 20 is released or pushed from the surface of the carrier tape 10 by the action of drawing tape over the peel bar 6, the leading edge of the deadfold sticker traverses toward the surface of a bag 17 and makes contact with the bag surface. Stickers 20 are provided with a pressure-sensitive adhesive surface, as will be discussed below, and this surface tends to adhere to most other surface (other than low adhesion or release coated surfaces). As the leading edge of a sticker makes contact with the surface of a bag 17, its pressure-sensitive adhesive "grabs" the surface of the bag 17 sufficiently to cause the deadfold sticker to be drawn with the movement of the bag on the conveyor 8. Thus, the motion of the conveyor 8 draws the leading edge of the deadfold sticker, because the leading edge is stuck on or grabs itself onto the surface of the bag 17. Therefore, the conveyor motion must be coordinated with the speed of motion (and any indexing motion) of the take-up reel 7 in drawing the carrier tape 10. The result of the leading edge of the deadfold sticker grabbing and adhering to the surface of bag 17 sufficiently to cause the deadfold sticker to be pulled by the movement of the bag 17 on the conveyor is that the entire adhesive surface of the deadfold sticker becomes nicely temporarily adhered to the surface of the bag—sometimes not so temporarily when extremely aggressive pressure-sensitive adhesives are employed. Thereafter, the bag 17 and temporarily adhered deadfold sticker pass on the conveyor between a pair of pressure rollers 9 which function to press and in essence permanently affix the deadfold sticker onto the side of a bag.

Figures 8, 9, 10:
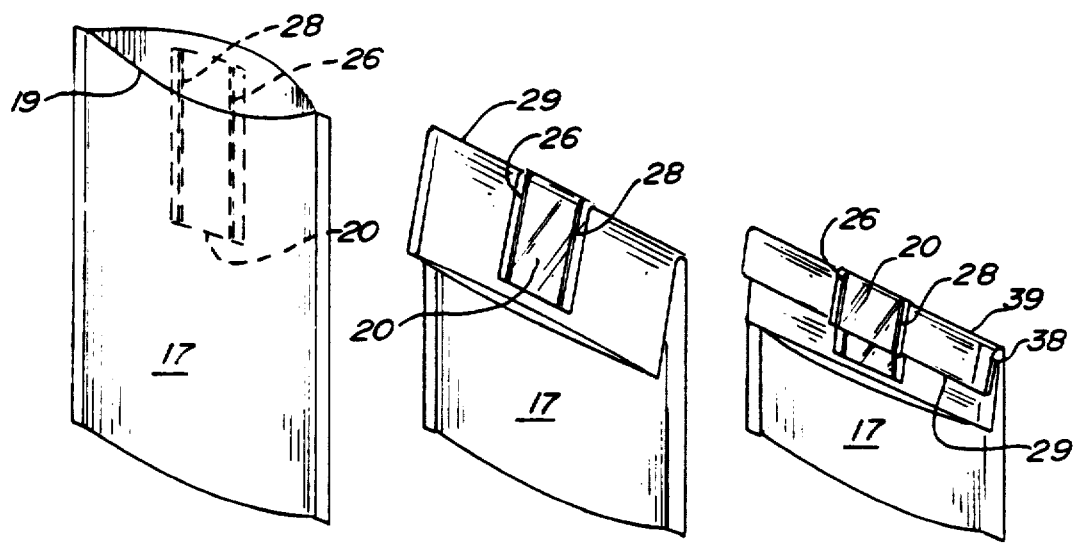
FIGS. 8, 9, and 10 are schematic perspective views of a flexible bag equipped with a deadfold reclosure sticker of the invention fixed to one side of the bag; these views illustrate the steps or stages of the fold-over-fold technique for forming preferred reclosures using stickers of the invention.

The application of the deadfold sticker 20 on the outer surface of a bag using the procedure of FIG. 1 is such that the deadfold wires 26 and 28 of the sticker extend perpendicularly to the mouth end 19 of the bag, as illustrated in FIG. 8. Thus, when the bag 17 in areas near its mouth 19 is collapsed upon itself—that is, flattened—the act of folding the mouth end upon itself effectively bends the deadfold wires 26 and 28 and those wires maintain a closed condition (and folded condition) for the bag.

A closed condition at the mouth of the bag is formed simply by folding a flattened bag mouth over itself as schematically illustrated in FIG. 9. This, in essence, is a step of forming a first fold in the flattened walls of the mouth end of the bag. This is but the first fold or crease 29; the crease is parallel to the mouth of the bag, and the fold is effective also to fold the affixed sticker and its deadfold wires into a double thickness. This first fold alone is suitable to effect mouth closure, but not a particularly effective closure. More is required to form the most preferred deadfold reclosure.

Following the first fold which gives a crease 29 as schematically illustrated in FIG. 9, the portion of the bag having the dual thickness (i.e., double thickness of sticker and folded bag walls formed as a result of the first fold in FIG. 9) is folded upon itself, to form the structure illustrated in FIG. 10. This second fold effectively puts two more folds or creases 38 and 39 into the mouth end of the bag, but with the result that the deadfold sticker of the mouth end of the bag effectively ends up with three folds in it (and in its deadfold wires). Thus two folds at the mouth end effectively create three folds or crease lines in the sticker 20 and its deadfold wires as well as in the flattened walls at the mouth end of the bag. A surprisingly strong and even "tight" reclosure is thus formed.

Figure 2:
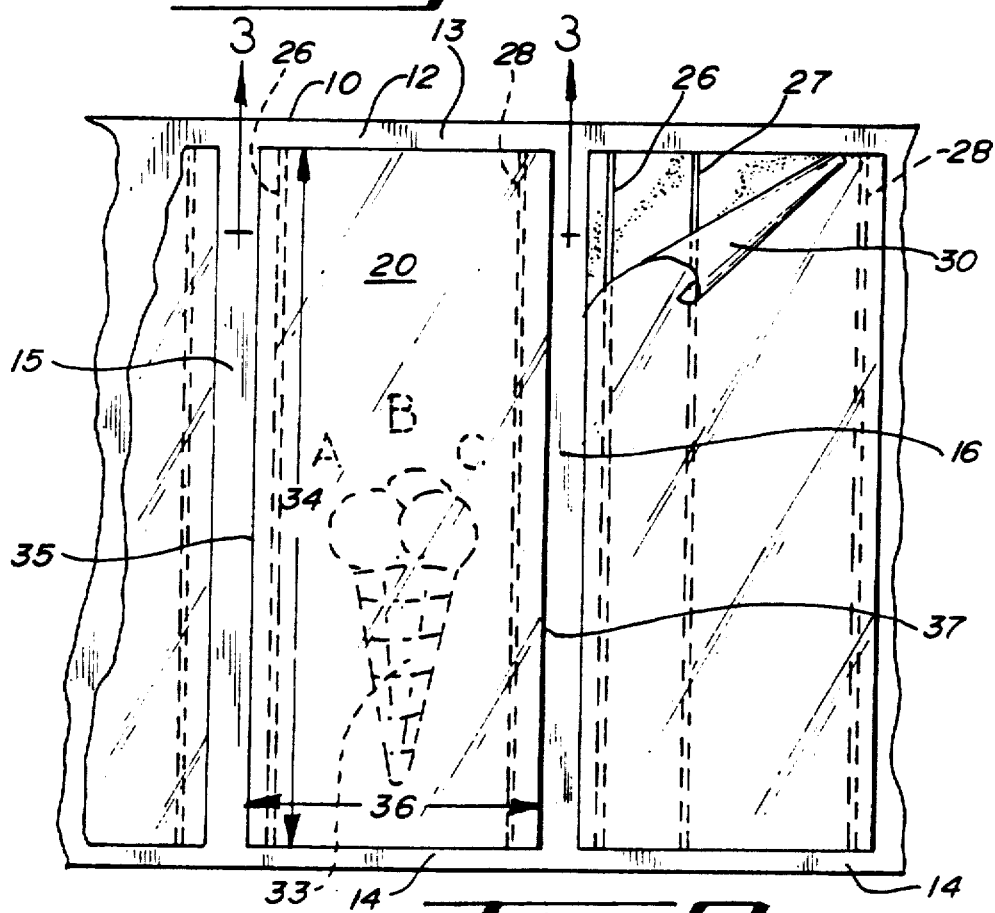
FIG. 2 is a schematic top plan view, with parts broken away, of a short length of carrier tape and discrete deadfold stickers temporarily adhered to the low-adhesion surface of the carrier tape.
Figure 3:
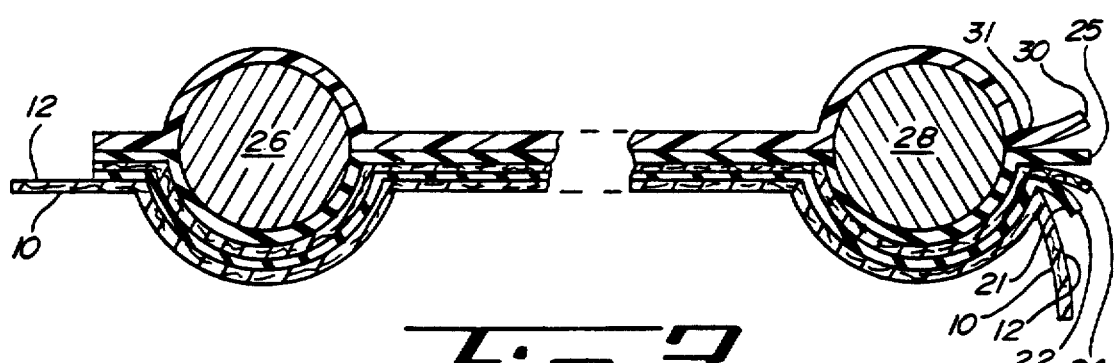
FIG. 3 is a schematic cross section taken on line 3—3 of FIG. 2, with some parts broken away, and with layers peeled apart at the right for visual clarity.

Further details for the dispensing roll of deadfold reclosure stickers will no be discussed with particular reference to FIGS. 2 and 3. The flexible carrier tape 10 is provided with a low-adhesion surface 12. Amongst the most economical of carrier tapes is paper; and a paper coated with a silicone low-adhesion coating is preferred. It is, however, within the ambit of the invention to employ any other flexible carrier tape having sufficient tensile strength in the longitudinal direction of it to withstand the application procedure for putting deadfold stickers on bags as illustrated in FIG. 1. Paper having about 1 or 1.5 mil thickness (e.g., about 40 lb. per ream) is useful as well as paper having a greater mil thickness range. Carriers are to be selected for reliability against tensile tear or accidental break during tape handling operations. Thus, tough polymer films, including polyester films, suitably provided with low adhesion release surfaces for release of pressure-sensitive adhesives, are advantageously employed in the practice of the invention. A variety of flexible tapes with low-adhesion surfaces, either as presently commercially available or as may be developed as technology advances, can be useful in the practice of the invention.

Most preferably, the deadfold stickers 20 are carried on the carrier tape as discrete deadfold stickers, as contrasted to a continuous strip or layer of deadfold material. Further, discrete stickers 20 have their lateral edges 35 and 37 (see FIG. 2) most preferably slightly spaced from the lateral edges of adjacent deadfold stickers on the carrier tape 10. Slight spacing between the lateral edges of adjacent deadfold stickers, as illustrated by the spaces 15 and 16 in FIG. 2, contributes to discrete application of a deadfold sticker per bag when one employs application apparatus comparable to that illustrated in FIG. 1. Such slight spacing may vary from as little as a millimeter or two up to about a centimeter. Thus, while abutment of lateral edges 35 and 37 against comparable lateral edges of adjacent deadfold stickers in linear arrangement on the carrier tape is possible, it is not preferred.

The deadfold stickers 20 have a first dimension 34 which is transverse to the length of the carrier tape and a second dimension 36 which is parallel with or in alignment with the length of the carrier tape 10. The first dimension 34 is shown in FIG. 2 as being greater than the second dimension 36. Illustratively, the first dimension 34 (parallel with deadfold wires 26 and 28) may vary from a low of about 3 or 4 cm up to as much as 40 or 50 cm, with lengths of about 5 cm to 25 cm probably the most common. The second dimension 36 (or width of a sticker) generally will fall within about 2 cm to 30 cm, with widths between about 3 cm and 20 cm being the most popular. Most stickers of this invention will have a greater length 34 than width 36, although in some rare instances stickers for some relatively wide mouthed bags may be greater in the second dimension 36 than the first dimension 34. For the most part, stickers of the invention are substantially rectangular if not truly rectangular. Of course, the corners of a rectangular sticker may be somewhat rounded if desired.

While not critical, preferred practice is to maintain the first dimension 34 of the deadfold stickers less than the width of the carrier tape so as to provide, at each end of the transversely oriented deadfold stickers, a border 13 and 14 of carrier tape. The borders 13 and 14 of carrier tape may be as small as 1 or 2 millimeters up to probably about a centimeter.

Optionally, many more deadfold wires than the two marked as 26 and 28 may be employed in a deadfold sticker according to the invention A further deadfold wire 27 is illustrated in FIG. 2. To be observed is that the deadfold wires terminate and are exposed at the ends of the stickers along lateral edges of tape 10. On the other hand, the wires in their length direction are not exposed along lateral sides or edges 35 and 37 of a sticker. The wires in their length direction, while preferably near edges of a sticker, are most preferably not at the extreme edge of a sticker. They are spaced from the edges and fully embedded along their length within the laminate of layers so as to be inseparable therefrom.

The deadfold stickers 20 have a base surface 21 which forms the interface or surface next to the low-adhesion surface of the carrier 10. Each deadfold sticker 20 comprises a laminate of pliable layers identified as 22, 24, 25, and 30 (see FIG. 3), plus at least two basic deadfold wires 26 and 28. The important point is that the deadfold wires are embedded in spaced parallel alignment in the laminate and lie in a direction transverse to the length of the carrier tape. The carrier tape, with its releasably adhered deadfold stickers, is wound upon itself in forming the dispensing rolls, with the result that the wires, as they exist in the dispensing roll, are in transverse parallel alignment.

Each reclosure sticker has an outer layer structure 30 having an exposed face 31, and an inner layer structure 24 situated between the outer layer structure and the carrier tape 10. A bonding layer 25 permanently unites the outer layer structure 30 to the inner layer structure 24, and secures the deadfold wires in embedded condition within the laminate. An adhesive layer 22 is united to the inner layer structure and forms the base surface 21 of the deadfold sticker.

The deadfold wires 26 and 28 are at least twice as great in thickness as the total thickness of all of the other layers of the laminate forming the discrete sticker. (This excludes the carrier tape thickness; it is not part of the discrete sticker.) In short, the most preferred deadfold stickers of the invention are those having the thinnest possible thickness for their laminate of pliable layers, with deadfold wires embedded in such laminates and having a thickness at least twice as great and frequently three or four times as great as the total thickness of all other layers of the deadfold stickers.

The outer layer structure 30 may vary in thickness from about 0.5 mil to about 5.0 mil (0.0005 to 0.005 in.; about 12 microns up to about 130 microns). It may consist of a simple, single polymeric film, suitably of polyethylene teraphthalate or polypropylene. It may comprise a multiplicity of layers which together form the outer layer structure 30 of the stickers. In this connection, reference is made to FIGS. 4 through 7 inclusive, each of which illustrates multiple layers or films which may be employed as the outer layer structure 30.

Figure 4:
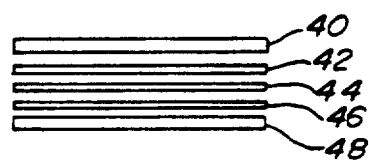
FIGS. 4 to 7, inclusive, are schematic cross sections of illustrative variations for the upper or outer layer structure of deadfold reclosure stickers of the invention.

In FIG. 4, the outermost layer is a clear film 40 (such as one of polyethylene teraphthalate, polypropylene, or other polymeric material) having a back reverse print or backprint 42 on its back or interior side. The backprint 42 may comprise any suitable inking or printing material, and may be a continuous or discontinuous layer of print of selected colors. A metallized layer 46 (e.g., a vapor deposit of metal) is applied upon a clear or opaque polymeric film 48. Then the metallized film 48 and the backprinted film 40 are adhesively united together by a thin layer of any suitable bonding adhesive 44.

Figure 5:
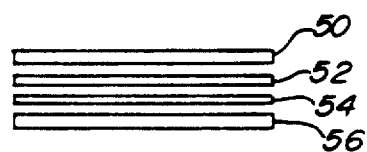

In FIG. 5, a clear polymeric film such as polyethylene teraphthalate is provided with a metallized layer deposit 56 on one side and a print of any suitable design 52 on the other. Over the print is then applied a varnish coat or clear overcoat of any suitable nature for the protection of the print layer 52.

Figure 6:
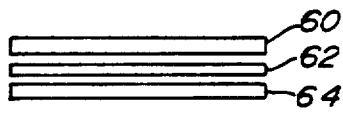

FIG. 6 illustrates a basic layer of paper 64 on which a print design 62 is applied and then a varnish layer 60 as an overcoat for protection of the print layer 62.

Figure 7:
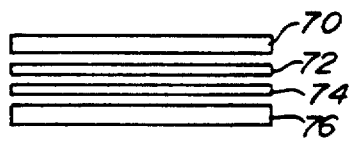

FIG. 7 is intended to illustrate use of a holographic layer 74 having a rear metallized layer 76 and a front print design 72, with an overcoat of varnish 70 for the protection of the print layer 72.

An almost infinite variety of layers, continuous and discontinuous, may be employed in the make-up of the outer layer structure 30 of the deadfold stickers. Those of FIGS. 4–7 are but illustrative. Advertising material may be incorporated in the outer layer structure 30, as for example illustrated by an ice cream cone 33 as well as the letters "ABC" in FIG. 2. Entirely clear or transparent outer layer structures may be employed. Decorative holographic designs may be used. A paper outer layer structure, unmarked and having an outer surface 31 receptive to marking as by ink or pencil, may be employed. The most preferred outer layer structures either consist of or have a layer of polymeric film or a layer of paper.

The lower or inner layer structure 24 is almost always formed of a single layer of either polymeric film or paper. However, it too may be formed of multiple layers. Generally, however, the inner layer structure will never exceed about 3 mils thickness and frequently will be as thin as about 0.5 mils, especially when the inner layer is or includes a polymeric film such as a polyester film or a polypropylene film. A 48 gauge Mylar polyester film is about 0.5 mil in thickness or about 25 microns in thickness, and is one of the more ideal thin inner layer structures to employ. However, 25-lb. per ream paper is about 2 mils or 50 microns thick, costs about half that of the 48 gauge Mylar polyester film, and in some applications is quite suitable to employ as either the outer or inner layer structure or both. Most ideally, both the outer layer structure and inner layer structure are formed using a polymeric film, especially biaxially oriented films since they generally exhibit good tensile strength. In this connection, the outer layer structure most preferably will exhibit a tensile strength in the direction transverse to (i.e., across) deadfold wires 26 and 28 at some level on the order of about 15,000 psi or more, with a yield value exceeding about half that figure of tensile strength. The tear and tensile strength for the outer layer structure should be sufficient to resist puncture of the outer structure by the large deadfold wires 26 and 28 in the laminate.

The bonding layer 25, as illustrated in FIG. 3, is such that it permanently holds the outer layer structure 30 and the inner layer structure 24 together, with the deadfold wires 26 and 28 fixed between them. Any suitable bonding material may be employed, with attention given to its properties for securely uniting the particular surfaces of the outer 30 and inner 24 layer structures. In this respect, polymeric film surfaces may be enhanced for their receptivity to bonding by corona treatment or any other of a variety of treatments currently available or developed as technology advances. A variety of bonding adhesives may be employed and polyurethane hot melt adhesives, especially those which are moisture curable, are but one example of adhesives desirable for uniting polyester films. For the most part, hot melt adhesives are preferred over solvent based ones for reasons based on avoidance of pollution problems. Hot melt adhesive formulations based on ethylene vinyl acetate are useful in the practice of the invention, especially where the adhesive bonding layer 25 is in contact with paper surfaces for the outer layer structure 30 and the inner layer structure 24. Still other bonding adhesives may be employed so long as the selection of the adhesive is based upon its properties for uniting particular surface materials contained on the surface of the outer and inner layers to be united. Pressure-sensitive adhesives may be employed but are not preferred because they too frequently allow some shift or flow of their material and thus may allow undesired shift or movement of the embedded deadfold wires. An important characteristic of the bonding layer is that it is flexible and does not crack on bending or folding. Elastomeric-type bonding adhesives which set up or cure or cool to a non-tacky condition are preferred, of which the polyurethanes as well as the ethylene vinyl acetates are exemplary.

The bonding layer is maintained as thin as possible but thick enough to permanently adhere the outer and inner layers of the laminate. The thickness generally will fall within the range of 0.5 to 2 mils, with the outer limits of thickness for the bonding layer at approximately 0.2 to 5 mils (about 2 or 3 microns up to about 125 or 130 microns).

Deadfold wires 26 and 28 for the deadfold stickers of this invention will rarely be as small as 27 gauge or 0.0175 in. in diameter. Preferably they will be at least as large as 25 gauge and even as large as 21 gauge or 20 gauge—20 gauge being about 0.0348 in. in diameter. Ductile wires of various metals or other materials may be employed as deadfold wires in the practice of the invention, with ductile wires of tin, iron, or aluminum the most preferred. The deadfold wires are frequently round in cross section, but other wire cross sections such as squares or rectangles may be employed.

The adhesive layer 22 typically and most preferably is a pressure-sensitive adhesive layer. Commonly, the pressure-sensitive adhesives are known as rubber-resin type adhesives. Depending on the specific adhesive formulation, they may be applied as a hot melt, a water dispersion, or a solvent dispersed or dissolved system. They have a balance of adhesion, cohesion, stretchiness, and elasticity which makes them aggressively and stably tacky at normal room temperature conditions, and indeed even at relatively low and also high temperature conditions. While known as rubber-resin type adhesives, it is important to recognize that the balance of properties exhibited by rubber-resin combinations can also arise and be exhibited by single polymeric materials or co-polymers, particularly those having an acrylate base. Suitable thicknesses for pressure-sensitive adhesive layer 20 will vary but generally will be at least about 2 or 3 microns and most often at least about 20 microns or even at least about 25 microns but rarely will be thicker than 3 mil or about 75 microns.

Importantly, the several layers making up the laminate as illustrated in FIG. 3 are maintained as thin as possible in the stickers made according to the invention, with the deadfold wires of the stickers dominating in size. Thus, the deadfold stickers having a thickness for the laminate of layers apart from the adhesive layer 22 not in excess of about 7 mils, and even a total thickness for all of the laminate layers including the adhesive not in excess of about 7 mils, in combination with deadfold wires at least twice as thick in diameter or breadth (in all directions transverse to the length of the wire) give exceedingly strong deadfold performance for the practice of the invention with high integrity for the sticker as a discrete article not easily pulled apart. In fact, attempts to separate layers of the sticker or separate deadfold wires from a sticker made according to the invention as most ideally practiced are destined for failure inasmuch a total mutilation of the sticker is required to accomplish such separation.

Manufacture of the stickers of the invention is suitably accomplished using known techniques such as those for manufacturing labels, except that deadfold wires are added and the layers pressed together to form the external contours of product as illustrated in FIG. 3. The dispensing roll of the invention is most readily formed by the technique for fixing printed sheets on a web as described in the U.S. Pat. No. 4,488,922 of Dec. 18, 1984, here incorporated by reference. Using that technique, laminates of outer layer structure, inner layer structure, and bonding layer with embedded deadfold wires are transferred from a stack of the same onto the carrier tape after applying adhesive to the release surface of the tape. The carrier tape with releasably adhered deadfold stickers is wound upon itself to form the dispensing roll; the winding may place the stickers on the inside surface of the tape (nearest the core) or on the outside surface of the tape as illustrated in FIG. 1.

In some applications as where designs or advertising or decorative material on an underlying bag surface are to show through the sticker, it is important to select the materials for the several layers of the sticker so as to provide for that transparency for the total laminate. Most frequently, however, stickers of the invention will contain layers of opaque material and will have separate markings or advertising material or the like on them.

Those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than th foregoing description; and all variations that come within the meaning and range of equivalency of the claims are therefore intended to be embraced thereby.

That which is claimed is:

1. A method of dispensing deadfold reclosure stickers from a dispensing roll of the same onto the side of an open mouthed bag, wherein said dispensing roll comprises a length of flexible carrier tape having a low adhesion surface and a plurality of flexible deadfold reclosure stickers releasably adhered to said low adhesion surface for easy removal therefrom, each said deadfold reclosure sticker comprising a laminate of pliable layers and at least two deadfold wires in spaced parallel alignment permanently embedded in said laminate in a direction transverse to the length of said carrier tape, said method including the steps of:

A. conveying a multiplicity of open-mouthed bags in linear alignment with the mouth of the bags facing a common direction, said bags being unfilled and in flattened condition, B. drawing said flexible carrier tape with its releasably adhered stickers from said dispensing roll around a peel element so as to sequentially release discrete reclosure stickers from said tape in a manner such that the leading edge of the sticker having a deadfold wire near it is first released and passed into temporary adherence onto the side of a conveyed bag at a location near the bag mouth so that the deadfold wires are in perpendicular relationship to the bag mouth, and C. passing the bag having a temporarily adhered reclosure sticker thereon between rollers to apply pressure for permanently affixing said reclosure sticker on said bag.

2. The method of forming a reclosable open mouth of a flexible bag, comprising:

A. removing the flexible carrier tape from a deadfold reclosure sticker temporarily adhered to said carrier tape in a dispensing roll of said stickers, each said sticker comprising a laminate of pliable layers and at least two deadfold wires in spaced parallel alignment embedded along their length in said laminate in a direction transverse to the length of said carrier tape, said removal of said carrier tape comprising drawing tape over a peel element, B. flattening the mouth of said bag to place opposing side walls of said mouth in substantial contact, and C. affixing said deadfold reclosure sticker on a side wall surface of said bag at a location bordering the mouth of said bag and with the deadfold wires of said sticker extending perpendicular to the mouth of said bag.

3. The method of claim 2 additionally comprising the step of making a first fold in the walls of the mouth end of said bag by folding said walls at the mouth end upon themselves in a manner effecting a first crease parallel to the mouth of the bag, said first fold being effective also to crease and fold the affixed sticker and its deadfolw wires into a double thickness.

4. The method of claim 3 additionally comprising folding the double thickness of said affixed sticker and mouth end walls upon themselves in a manner effecting, by a single second fold step, two more folds in said sticker and in said walls at the mouth end of said bag, said two more folds having crease lines parallel to said first crease.

* * * * *